United States Patent [19]
Miller

[11] Patent Number: 5,837,961
[45] Date of Patent: Nov. 17, 1998

[54] LASER WIRE STRIPPING APPARATUS HAVING MULTIPLE SYCHRONOUS MIRRORS AND A METHOD THEREFOR

[76] Inventor: Richard T. Miller, 3210 E. Corrine Dr., Phoenix, Ariz. 85032

[21] Appl. No.: 562,618

[22] Filed: Nov. 24, 1995

[51] Int. Cl.⁶ .................................................. B23K 26/10
[52] U.S. Cl. .............................. 219/121.68; 219/121.79; 219/121.8; 219/121.69; 219/121.85
[58] Field of Search ..................... 29/564.4; 219/121.6, 219/121.67, 121.68, 121.69, 121.73, 121.74, 121.75, 121.76, 121.77, 121.78, 121.79, 121.8, 121.83, 121.85

[56] References Cited

U.S. PATENT DOCUMENTS

| | | | |
|---|---|---|---|
| 3,953,706 | 4/1976 | Harris et al. | 219/121.68 |
| 4,045,201 | 8/1977 | Caffarella et al. | 219/121.79 |
| 4,601,093 | 7/1986 | Cope | 29/564.4 |
| 4,671,848 | 6/1987 | Miller et al. | 219/121.85 |
| 4,761,535 | 8/1988 | Lawson | 219/121.68 |
| 4,931,616 | 6/1990 | Usui et al. | 219/121.68 |
| 4,951,369 | 8/1990 | Verrall | 29/564.4 |
| 4,970,367 | 11/1990 | Miller | 219/121.68 |
| 5,058,260 | 10/1991 | Gloe et al. | 29/564.4 |
| 5,142,121 | 8/1992 | Ezaki et al. | 219/121.85 |

FOREIGN PATENT DOCUMENTS

| | | |
|---|---|---|
| 1-71584 | 3/1989 | Japan. |
| 1-295609 | 11/1989 | Japan. |
| 4-17989 | 1/1992 | Japan ................................. 219/121.6 |
| 4-33510 | 2/1992 | Japan. |
| 4-275007 | 9/1992 | Japan. |
| 88/07431 | 10/1988 | WIPO ............................. 219/121.85 |

OTHER PUBLICATIONS

Nivens, L.G., "Laser Beam Wire Stripping Machine", Western Electric Technical Digest, No. 56, Oct. 1979, pp. 19–20.
Iceland, W., "Laser Wire Stripping: Equipment and Operational Notes", Insulation/Circuits, vol. 26, No. 4, Apr. 1980, pp. 47–50.

*Primary Examiner*—Gregory L. Mills
*Attorney, Agent, or Firm*—Harry M. Weiss; Jeffrey D. Moy; Harry M. Weiss & Associates, P.C.

[57] ABSTRACT

A laser wire stripping apparatus is disclosed comprising, in combination a plurality of mirrors for alternatively directing a laser beam over a first portion of an insulated wire and an opposite portion of the insulated wire to permit removal of an end segment of insulation from the insulated wire, and a single motor coupled to the plurality of mirrors for synchronizing motion of the mirrors in order to direct the laser beam over the first portion and the opposite portion of the insulated wire. The apparatus also includes an optical sensor for activating the apparatus when the insulated wire is inserted therein. The apparatus further includes a clamping portion for holding the insulated wire as the laser beam cuts the insulation.

26 Claims, 5 Drawing Sheets

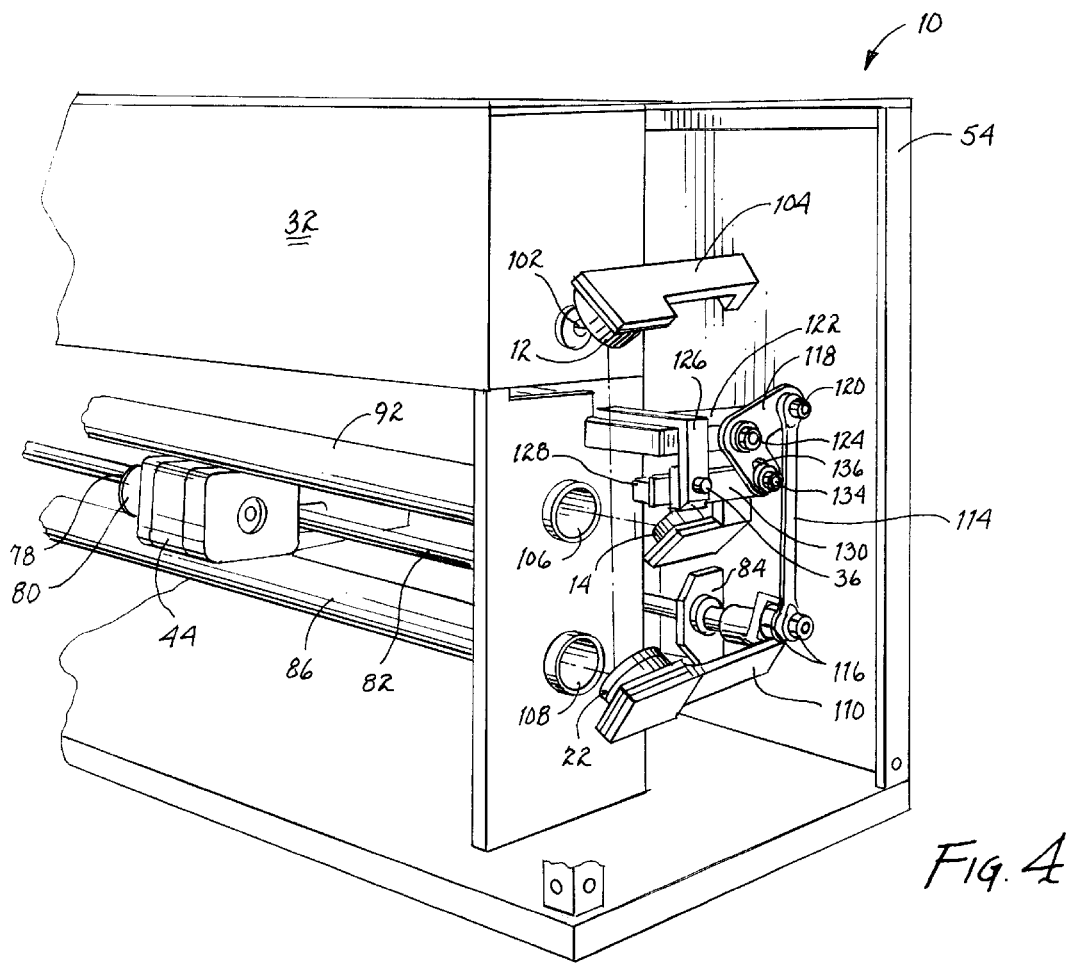
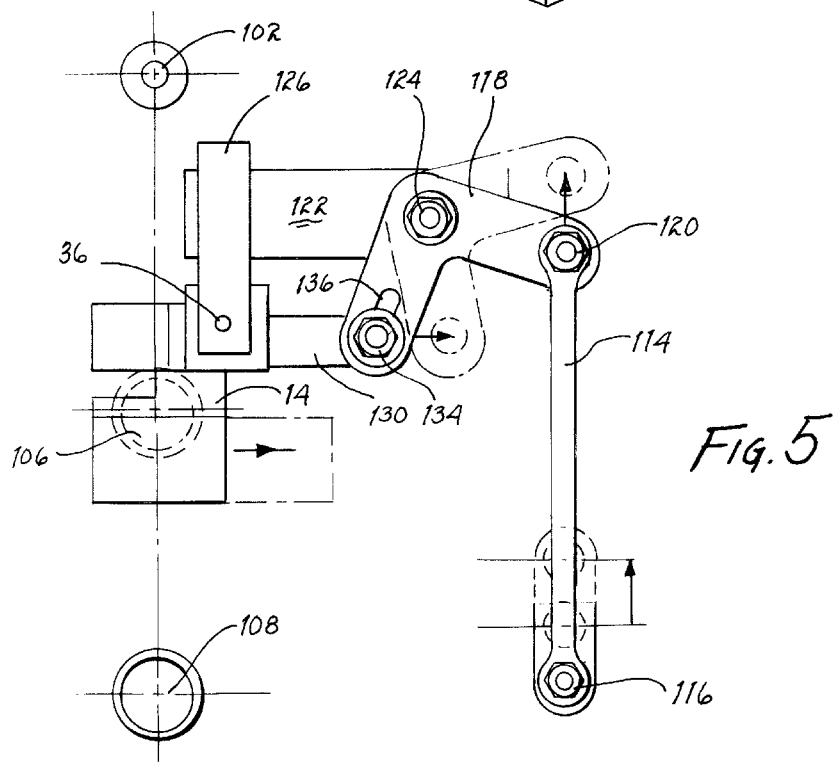
Fig. 4
Fig. 5

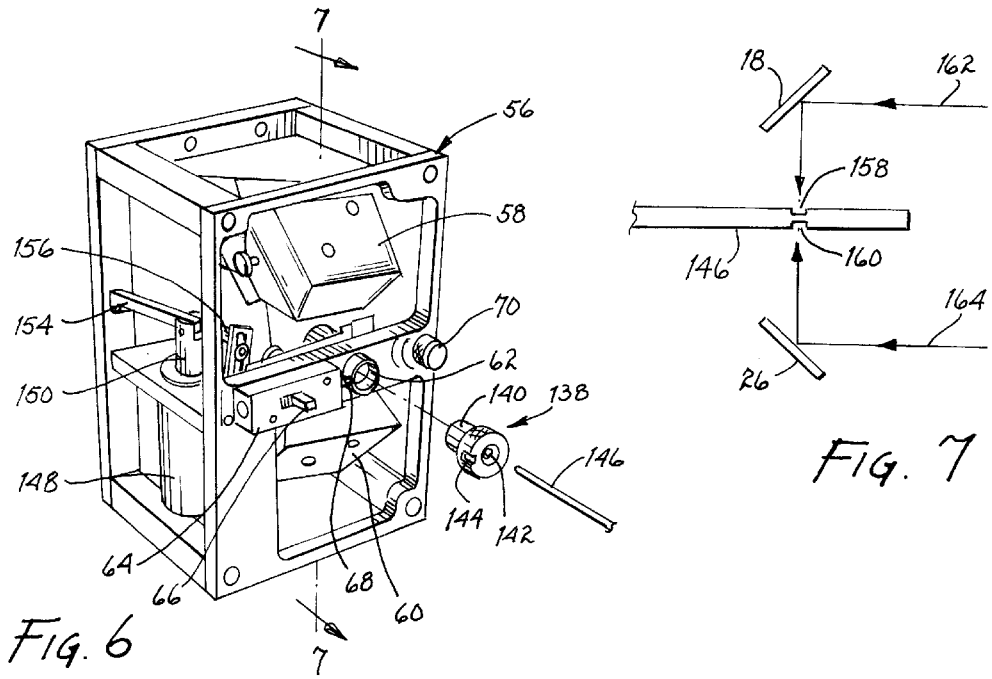
FIG. 6
FIG. 7
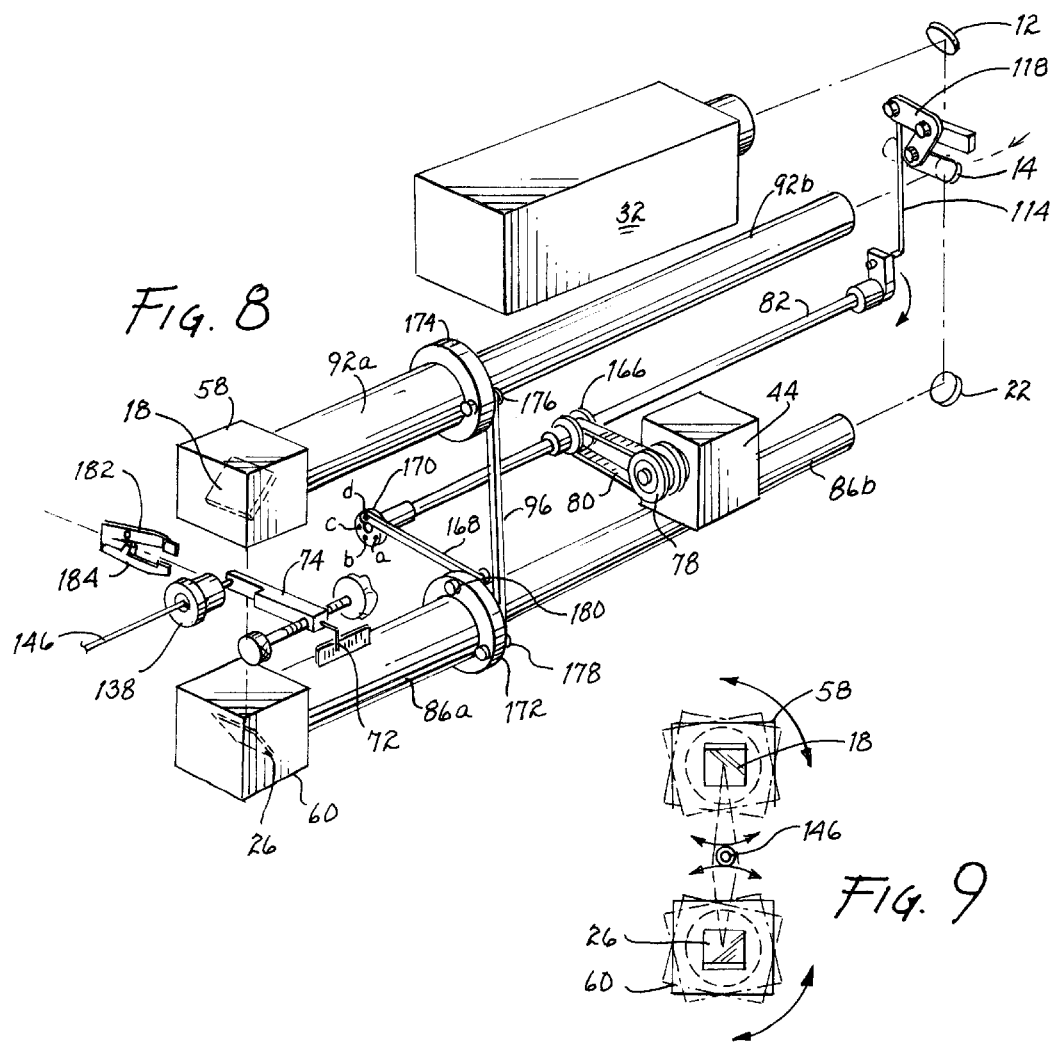
FIG. 8
FIG. 9

LASER WIRE STRIPPING APPARATUS HAVING MULTIPLE SYCHRONOUS MIRRORS AND A METHOD THEREFOR

RELATED APPLICATION

This patent application is related to issued U.S Pat. No. 4,970,367 entitled "Laser Wire Stripper Apparatus and Method Therefor," in the name of the same inventor, which is incorporated herein by reference.

BACKGROUND OF THE INVENTION

1. Field of the Invention

This invention is in the field of wire stripping apparatus and methods therefor and, more particularly, is a laser wire stripping apparatus implementing a single motor for directing a plurality of mirrors in order to scan a laser beam over an insulated wire and a method therefor.

2. Description of the Related Art

Commercially available wire is typically covered by an insulating material. To facilitate coupling wire to an electrical connector, one must first remove an end segment of insulation from the wire. One prior art device for stripping insulation from wire is a mechanical, hand-operated, wire stripper. These devices are relatively slow, and therefore inefficient. More importantly, hand-operated wire strippers have a tendency to damage the wire as the insulation is removed. Another prior art wire stripping device consists of one or more rotary blades that cut the insulation, thereby permitting a user to remove the insulation from the wire. While this approach is certainly more efficient than a hand-operated wire stripper, it still suffers from the problem of potential wire damage.

Other prior art wire stripping devices have implemented lasers, as opposed to mechanical means, to cut a portion of insulation and permit a user to remove the end segment of insulation from the wire. These devices typically use a single laser beam, and require a user to move the insulated wire around the beam in order to facilitate cutting. Manual rotation of the wire can introduce imprecision into the cutting process. Therefore, there existed a need to provide a compact, laser wire stripping apparatus using a single motor for moving a plurality of mirrors in order to redirect a laser beam over a first portion and an opposite portion of an insulated wire held by mechanical means and a method therefor.

SUMMARY OF THE INVENTION

An object of the present invention is to provide a laser wire stripping apparatus and a method therefor.

Another object of the present invention is to provide a laser wire stripping apparatus for cutting insulation in an insulated wire without damaging the inner wire and a method therefor.

Yet another object of the present invention is to provide a laser wire stripping apparatus using a single motor for moving a plurality of mirrors that direct a laser beam in order to make a cut in an end segment of insulation in an insulated wire, thereby permitting easy removal of the end segment of insulation and a method therefor.

Still another object of the present invention is to provide a laser wire stripping apparatus having means for varying the length of the segment of insulation for removal and a method therefor.

Another object of the present invention is to provide a laser wire stripping apparatus for use with insulated wires having different widths.

BRIEF DESCRIPTION OF THE PREFERRED EMBODIMENTS

According to the present invention, a laser wire stripping apparatus is disclosed comprising, in combination, a plurality of mirror means for alternatively directing a laser beam over a first portion of an insulated wire and an opposite portion of the insulated wire to permit removal of an end segment of insulation from the insulated wire, and motor means coupled to the plurality of mirror means for synchronizing motion of the plurality of mirrors means in order to direct the laser beam over the first portion and the opposite portion of the insulated wire. In the preferred embodiment of the instant invention, the motor means comprises a single motor. The plurality of mirror means includes first mirror means having a first position for directing the laser beam in a track leading to the first portion of the insulated wire and having a second position located out of the laser beam. Additionally, the plurality of mirror means includes second mirror means for directing the laser beam from the first mirror means in the first position over the first portion of the insulated wire. The plurality of mirror means further includes third mirror means for directing the laser beam over the opposite portion of the insulated wire when the first mirror means is in the second position. Fourth mirror means are also included for directing the laser beam to the third mirror means when the first mirror means is in the second position.

The motor means has shaft means coupled to a transmission shaft for rotating the transmission shaft. The apparatus further includes first rotation means eccentrically coupled to a first end of the transmission shaft for rotating the third mirror means. The first rotation means comprises a first member eccentrically coupled at an end thereof to the first end of the transmission shaft, first collar means coupled to an opposite end of the first member for rotating the third mirror means, and first tubular member means coupled to the first collar means for rotating the third mirror means and for passing the laser beam therethrough to the third mirror means. Additionally, the apparatus includes second rotation means coupled to the first rotation means for rotating the second mirror means. The second rotation means comprises a second member coupled at an end thereof to the first rotation means, second collar means coupled to an opposite end of the second member for rotating the second mirror means, and second tubular member means coupled to the second collar means for rotating the second mirror means and for passing the laser beam therethrough to the second mirror means.

The apparatus further includes oscillating means eccentrically coupled to a second end of the transmission shaft for moving the first mirror means between the first position and the second position. The oscillating means comprises a third member eccentrically coupled at an end thereof to the transmission shaft, a fourth member having a substantially L-shaped configuration and being coupled at an end thereof to an opposite end of the third member, and being pivotally coupled at a mid-portion thereof to a support member, slide bearing means coupled to another end of the fourth member for sliding the first mirror means between the first position and the second position, delay means within the fourth member for delaying movement of the first mirror means from the second position to the first position, and sensor means coupled to the support member for measuring position of the first mirror means. The delay means comprises a slot near the other end of the fourth member, and slidable connector means coupled to the slide bearing means and penetrating the slot for sliding within the slot and delaying movement of the first mirror means from the second position to the first position.

The apparatus further includes clamping means for holding the insulated wire in a path for the laser beam. The clamping means comprises a support housing, wire guide means coupled to the support housing for guiding the insulated wire into the path, locking means coupled to the support housing for locking the wire guide means into place, sensor means coupled to the support housing for detecting when the insulated wire is in the path and for actuating the apparatus, and clamping arm means coupled to the support housing for holding the insulated wire in the path.

The wire guide means comprises a tubular cavity in the support housing, guide member means having a tubular portion for insertion into the tubular cavity and having another cavity extending through the guide member means for inserting the insulated wire therethrough, and notch means in an outer surface of the guide member means for locking with the locking means. The locking means includes spring-loaded locking tab means coupled to the support housing for insertion into the notch means. The sensor means comprises a reference member, transmitter means coupled to the reference member for transmitting a signal, receiver means coupled to the reference member for receiving the signal and for initiating the apparatus, signal reflector means coupled to the reference member for reflecting the signal from the transmitter means to the receiver means when the insulated wire penetrates the other cavity in the guide member means and moves the signal reflector means into position to reflect the signal, and adjustment means coupled to the reference member for adjusting distance between the signal reflector means and the clamping arm means.

The clamping arm means comprises an upper arm pivotally coupled to the support housing, a lower arm pivotally coupled to the support housing, spring means coupled to the support housing and to an end portion of the upper arm for pulling down on the end portion of the upper arm and opening the clamping arm means, a first protruding portion extending downwardly from the upper arm substantially toward a pivot point for the lower arm, a second protruding portion extending upwardly from the lower arm substantially toward a pivot point for the upper arm and contacting the first protruding portion, actuator means coupled to an end portion of the lower arm for forcing the upper arm and the lower arm to close and grip the insulated wire, and mechanical stop means for limiting motion of the upper arm due to the spring means and for limiting motion of the lower arm. A plurality of lens means are also disposed in the laser beam for focusing the laser beam.

According to another embodiment of the present invention, a method for stripping insulation from an insulated wire is disclosed comprising the steps of reflecting a laser beam off of a first mirror in a first position to a second mirror, rotating the second mirror in order to scan the laser beam over a first portion of the insulated wire, moving the first mirror to a second position out of the laser beam to reflect the laser beam off of a third mirror to a fourth mirror, and rotating the fourth mirror in order to scan the laser beam over an opposite portion of the insulated wire. The steps of rotating the second mirror, moving the first mirror, and rotating the fourth mirror are provided by operating a single motor rotating a transmission shaft coupled to the first mirror, the second mirror, and the fourth mirror. The method further includes the steps of inserting the insulated wire through a cavity in a wire guide, moving a reflector with the insulated wire penetrating the wire guide, reflecting a signal from a transmitter off of the reflector to a receiver when the reflector has been moved by the insulated wire, and clamping the insulated wire in response to receipt of the signal at the receiver. Additionally, this method includes the steps of withdrawing the insulated wire from the wire guide, and removing an end segment of insulation from the insulated wire severed from another portion of insulation by passing the laser beam over the first portion and the opposite portion of the insulated wire. The steps of rotating the second mirror and rotating the fourth mirror direct the laser beam in a single plane over a top and a bottom portion of the insulated wire.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 4 is a perspective view from the back of the laser wire stripping apparatus showing the oscillating portion for moving the shuttle mirror.

FIG. 5 is a planar view of the rear of the laser wire stripping apparatus showing motion of the oscillating portion.

FIG. 6 is a perspective view of the clamping portion of the laser wire stripping apparatus.

FIG. 7 is a cross-sectional view taken along the line 7—7 in FIG. 6 showing the flowpaths of the laser beam which result in vaporizing a portion of insulation from an insulated wire.

FIG. 8 is a perspective view of portions of the interior of the laser wire stripping apparatus showing how the single motor synchronizes motion of the mirrors to cut the insulated wire.

FIG. 9 is a front planar view of a portion of the wire stripping apparatus showing how the scanning mirrors direct the laser beam over a first portion and an opposite portion of the insulated wire. Note that the clamping portion and the rest of the apparatus is not shown for the sake of simplicity.

DESCRIPTION OF THE PREFERRED EMBODIMENTS

Figure 1:
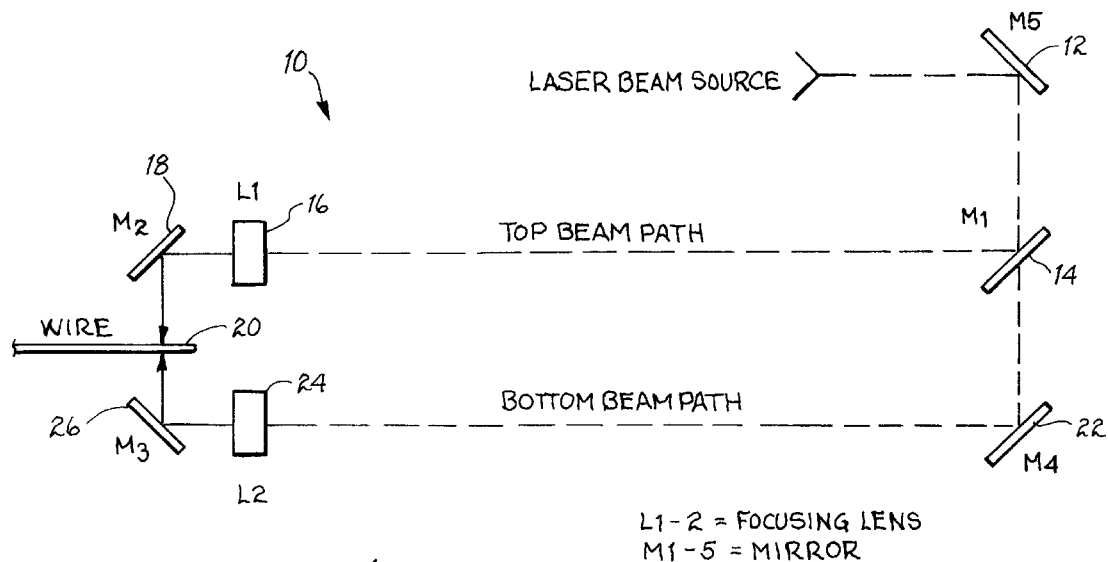
FIG. 1 is a simplified system diagram showing the laser beam flowpaths of the laser wire stripping apparatus.

Referring to FIG. 1, a simplified system diagram shows the laser beam flowpaths of the laser wire stripping apparatus, or more simply, the apparatus, which is generally designated by reference number 10. The apparatus 10 provides a laser beam which is reflected off of a mirror 12 (M5). Note that several different types of laser beam sources could be implemented; however, selection of a laser beam source providing a beam which will cut the insulation from an insulated wire 20 without damaging the inner wire is crucial. Such laser beam sources are well known in the art.

The laser beam reflected off of mirror 12 is directed to either mirror 14 (M1) or mirror 22 (M4) depending upon the position of mirror 14. Unlike mirror 12, which is fixed, mirror 14 is movable. In particular, mirror 14 oscillates along a line substantially orthogonal to the page on which FIG. 1 lies. Accordingly, mirror 14 is referred to as the shuttle mirror 14. In a first position, the shuttle mirror 14 directs the laser beam in the top beam path leading to the first or top portion of the insulated wire 20. The second position of the shuttle mirror 14 is located out of the path of the laser beam reflected from mirror 12. Thus, when the shuttle mirror 14 is in its second position, the laser beam from mirror 12 is reflected off of another fixed mirror 22 in order to travel along the bottom beam path. Note that the first position of the shuttle mirror 14 is its home position, or the position of the mirror 14 at the beginning and at the end of the cycle of the apparatus 10.

The top and bottom beam paths include a focusing lens 16 (L1) and 24 (L2), respectively, for focusing the laser beam. In the preferred embodiment, focusing lenses 16 and 24 are converging lenses; however focusing lenses are well known in the art, and different types of lenses could be implemented, if desired. Additionally, more than one lens per beam path could be used, if needed. As the laser beam traverses the lens 16 in the top beam path, it is reflected off of yet another mirror 18 (M2). Similarly, as the laser beam crosses the lens 24 in the bottom beam path, it is reflected off of still another mirror 26 (M3). Like the shuttle mirror 14 which oscillates, mirrors 18 and 26 also oscillate, but in a slightly different manner. Whereas the shuttle mirror 14 oscillates in a linear motion, mirrors 18 and 26 rotate about their respective axis, and more particularly, oscillate about their respective axis from one position to another in order to scan the laser beam over the insulated wire 20. Thus, mirrors 18 and 26 are referred to as scanning mirrors.

Looking down the axes of the scanning mirrors 18 and 26 from the left of FIG. 1, mirror 18, starting from its home, left most position, scans the laser beam from left to right over the top of the insulated wire 20, and then rotates back from right to left to its home position. Note that as scanning mirror 18 moves back to its home position, the laser beam is cutting the bottom of the insulated wire 20. Scanning mirror 26, starting from its home, right most position, rotates to its left most position as the laser beam cuts across the top of the insulated wire 20. Then, once the upper scan of the laser beam is complete, mirror 26 is at its left most position from which it scans the laser beam from left to right over the bottom of the insulated wire 20, thereby returning scanning mirror 26 to its home and right most position. In the preferred embodiment of the instant invention, the scanning mirror 18 cuts across the top of the insulated wire 20 before the scanning mirror 26 cuts over the bottom of the insulated wire 20; however, if desired, this order could be reversed. Additionally, note that one could reverse the scanning direction to right to left during the cutting period for both scanning mirrors 18 and 26, if desired. The area covered by the laser beams from scanning mirrors 18 and 26 lies in a single plane such that the cuts across the upper portion and the bottom portion of the insulated wire 20 merge, thereby permitting a user to remove the end segment of insulation from the insulated wire 20. Note that the particular means for synchronizing the motion of the shuttle mirror 14 and the scanning mirrors 18 and 26 as well as the means for holding the insulated wire 20 will be discussed hereinafter.

Figure 2:
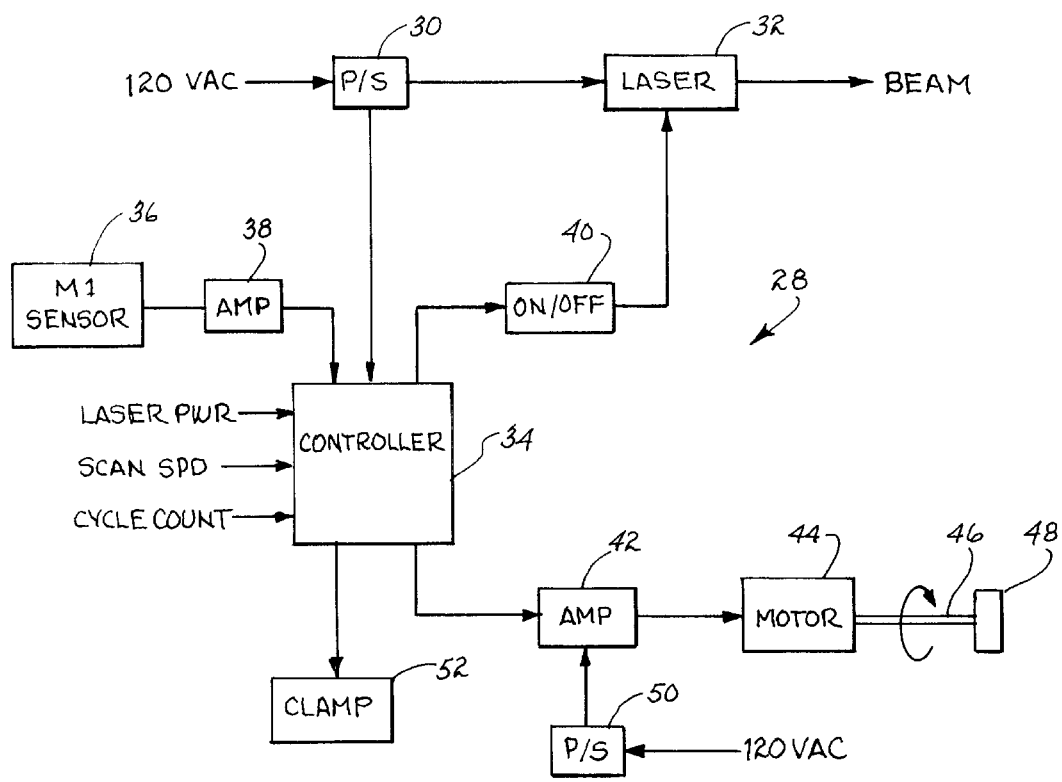
FIG. 2 is a simplified electrical block diagram of the laser wire stripping apparatus.

Referring to FIG. 2, a simplified electrical block diagram of the laser wire stripping apparatus 10 is shown and generally designated by reference number 28. 120 VAC is supplied to a power supply converter 30 which supplies the required power to the laser beam source 32. The power supply converter 30 also supplies power to the apparatus controller 34. The controller 34 supplies ON/OFF control signals 40 to the laser beam source 32. A sensor 36 for measuring the position of the shuttle mirror 14 supplies a control signal to an amplifier 38 which sends a processed signal to the controller 34. In the preferred embodiment of the apparatus 10, the sensor 36 is a magnetic type position sensor well known in the art; however, other well known position sensors such as an optical position sensor could be substituted.

The controller 34 supplies control signals to a solenoid for operating a clamp 52 which holds the insulated wire. Additionally, the controller 34 sends control signals to a motor 44 via an amplifier 42. In the preferred embodiment, the motor 44 is a DC stepper motor although other types of motors could be used. The motor 44 rotates a shaft 46 that drives a load 48 which is symbolic of driving the mirrors 14, 18, and 26. The motor 44 is supplied power via a power converter 50 connected to a 120 VAC source and to the amplifier 42.

The controller 34 has three user-selected inputs, namely laser power, scan speed, and cycle count. A user can select laser power level as a percentage of full power for the laser beam source 32, and the controller 34 supplies the appropriate control signals to the laser beam source 32. The scan speed input permits a user to alter the duration of laser beam exposure over the insulated wire. This input determines the speed control signals sent to the motor 44, and the speed of the mirrors 14, 18, and 26 is proportional to the motor speed. The cycle count input determines how many times the laser beam will be scanned over the insulated wire. In other words, it is possible to have multiple passes of the laser beam over both the top and bottom of the insulated wire. Note that those with skill in the art can use any one of a plurality of controllers to accomplish the functions generated by controller 34.

Figure 3:
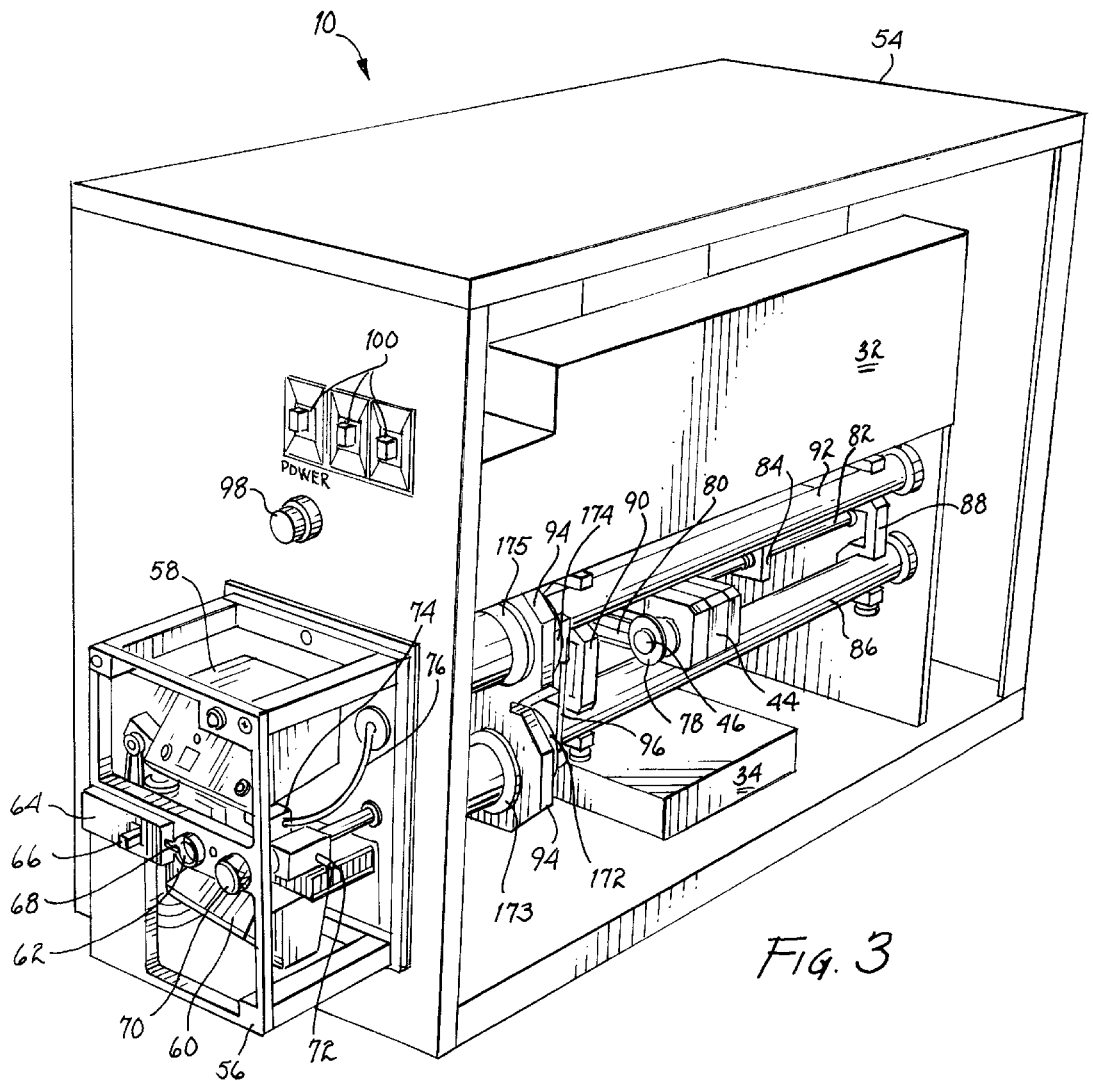
FIG. 3 is a perspective view of the laser wire stripping apparatus showing the interior of the wire clamping portion and the rest of the apparatus.

Referring to FIG. 3, the laser wire stripping apparatus 10 is shown in perspective view. The apparatus 10 has a housing 54 having top, bottom, front, back and side panels. The front of the apparatus 10 is shown facing left in FIG. 3. Note that the right side panel of the apparatus housing 54 is removed in order to show the interior of the apparatus 10. Connected to the front panel of the apparatus housing 54 is another housing 56 for the clamping portion of the apparatus 10. The clamping portion housing 56 has its top, front, and right side panels removed so that the interior can be seen.

Referring to the clamping portion of the apparatus 10, the housing 58 retains the scanning mirror 18 (not shown). Similarly, the housing 60 holds the scanning mirror 26 (not shown). A tubular cavity 62 penetrates a front face of the clamping portion housing 56. Hereinafter, this tubular cavity shall be referred to as the collet guide since a collet (not shown) is inserted therein for holding the insulated wire. A locking device 64 having a spring-loaded locking tab 68 is provided for locking the collet into place within the collet guide 62. By sliding the operating arm 66 of the locking device 64 to the left against the opposing force associated with the internal spring (not shown), the locking tab 68 is retracted in order to permit a user to insert the collet into the collet guide 62. Then, the user releases the operating arm 66 such that the locking tab 68 engages a notch 144 in the collet 138 (see FIG. 6).

A sensor device 74 is located within the clamping portion for actuating the apparatus 10 when the insulated wire is inserted through the path for the laser beam. Clamping arms (see FIGS. 8, 10, and 11) are also provided within the clamping portion. In order to describe the relative position between the clamping arms and the sensor device 74 within the clamping portion, as an insulated wire is inserted into the clamping portion, it first passes through the collet 138 (see FIG. 6), through the opened clamping arms 182 and 184 (see FIG. 10), and then reaches the sensor device 74 (see FIG. 12) in order to activate the apparatus 10. An adjustment screw 70 is also provided. The adjustment screw 70 penetrates an aperture in the clamping portion housing 56 and another aperture in the sensor device 74. A user turns the adjustment screw 70 to move the sensor device 74 either toward the front or the back of the clamping portion. Since contact of the end of the insulated wire with the sensor device 74 actuates the apparatus 10, by moving the position of the sensor device 74 with the adjustment screw 70, the user can select the position on the insulated wire where the cut is to be made. A measuring pointer 72 coupled to the adjustment screw 70 permits the user to determine and select the position on the insulated wire where the cut is to be made. A pair of fiber optic cables 76 carry signals from the sensor device 74 to the controller 34.

Focusing now on the interior of the rest of the apparatus 10, connected to the shaft 46 of the motor 44 is a pulley 78. A bell 80 runs from the pulley 78 to another pulley 166 (see FIG. 8) on the transmission shaft 82. Rotation of the motor shaft 46 therefore causes the rotation of the transmission shaft 82. A support bearing 84 is coupled to the apparatus housing 54 to support the transmission shaft 82. The first 86 and second 92 tubular members are provided for rotating scanning mirrors 26 and 18, respectively. Additionally, the first and second tubular members 86 and 92 serve to keep debris out of the optical components of the apparatus 10. The tubular members 86 and 92 are supported by support members 88 and 90 which are coupled to the interior of the apparatus housing 54. An additional support member 94, which is also coupled to the interior of the apparatus housing 54, retains bearings 173 and 175 for the first 86 and second 92 tubular members, respectively. Note that additional bearings similar to 173 and 175 could be used to bolster support for the first 86 and second 92 tubular members, if desired. First 172 and second 174 collars are coupled to the first 86 and second 92 tubular members, respectively, such that rotation of the collars 172 and 174 causes the corresponding tubular member 86 or 92 to rotate. Each tubular member 86 and 92 has a split (not shown) in-between its bearing 173 or 175 and its collar 172 or 174 such that the first 86 and second 92 tubular members are fixed to the right of the split, but to the left side of the split, the tubular members 86 and 92 are free to rotate. Note that the lenses 24 and 16 from FIG. 1 are located within the first 86 and second 92 tubular members, respectively, and in proximity to the boundary between the members 86 and 92 and their corresponding mirror housings 60 and 58. Additionally, situated on the front panel of the apparatus housing 54 are a power button 98 for powering up the apparatus 10, and a series of selectors 100 corresponding to the laser power, scan speed, and cycle count functions described in reference to FIG. 2. Note that any of a plurality of different types of selectors such as buttons, switches, or dials could be implemented for 98 and 100. Lastly, the laser beam source 32 is seen within the apparatus housing 54.

Referring to FIGS. 4 and 5, the oscillating portion of the apparatus 10 is shown. The laser beam emanates from an aperture 102 in the laser beam source 32. The beam is then reflected off of the mirror 12 which is held in place by a member 104 that is coupled to an inner surface of the apparatus housing 54. The beam from the mirror 12 is reflected off of the shuttle mirror 14 assuming that the apparatus 10 beginning a cycle. This is so because the home position for the shuttle mirror 14 (i.e. the starting and stopping position for mirror 14 during a complete cycle of the apparatus 10) is in the laser beam path from mirror 12. An interior wall of the apparatus housing 54 has apertures 108 and 106 aligned with the axes of the first 86 and second 92 tubular members, respectively, for admitting the laser beam. Thus, the reflected laser beam from shuttle mirror 14 is directed through aperture 106 and through the second tubular member 92. When the shuttle mirror 14 is in its second position located out of the beam path, the reflected beam from mirror 12 is directed to mirror 22, through the aperture 108, and through the first tubular member 86. The mirror 22 is coupled to the interior of the apparatus housing 54 via member 110.

The motor 44 drives the transmission shaft 82 via the pulley 78 and belt 80 arrangement. The support bearing 84 is coupled to an inner surface of the apparatus housing 54 to support the transmission shaft 82. Note additional transmission shaft support bearings can be implemented, if desired. A member 114 is eccentrically coupled at an end thereof to the transmission shaft 82 via connectors 116. Another member 118 that has a substantially L-shaped configuration is coupled at an end thereof with connector 120 to an opposite end of member 114. This L-shaped member 118 is pivotally coupled at a mid-portion thereof with a connector 124 to a support member 122. The other end of the L-shaped member 118 is coupled to a slide bearing 130 with a connector 134. The slide bearing 130 works in connection with a fixed member 128 which provides the track over which the slide bearing 130 runs. Coupled to and extending downwardly from the support member 122 is a sensor support member 126 which retains the position sensor 36. Position sensor 36 corresponds to the sensor 36 in FIG. 2 for measuring and sending information regarding the position of the shuttle mirror 14 to the controller 34. A slot 136 in the L-shaped member 118 permits the connector 134 coupled to the slide bearing 130 to slide within the slot 136 as the slide bearing 130 moves. More significantly, as the shuttle mirror 14 moves from its second or right position to its first or left position (home), the slot 136 has enough free play to create a time delay before the shuttle mirror 14 moves back to its home position.

FIG. 5 is helpful in demonstrating how motion of the oscillating portion causes movement of the shuttle mirror 14. First, recall that the transmission shaft 82 is eccentrically coupled to the member 114, and therefore, rotation of the transmissions shaft 82 causes a substantially linear, oscillatory motion of member 114. FIG. 5 demonstrates this by showing member 114 first in a down position, and then in an up position, in phantom. As member 114 oscillates between its up and down positions, the L-shaped member 118 swings about its pivotal connection 124. Motion of the L-shaped member 118 causes the slide bearing 130 and the shuttle mirror 14 to move between the home, left position and the right position of the shuttle mirror 14. As previously noted, the shuttle mirror 14 is in its home position when the apparatus 10 begins its cycle. Thus, the laser beam follows the top beam path (see FIG. 1) to cut the top of the insulated wire. As the top cut is completed, the member 114 moves upward, thereby causing the slide bearing 130 and the shuttle mirror 14 to move to the right position. Additionally, the connector 134 in the slot 136 slides toward the upper limit of the slot 136. With the shuttle mirror 14 in its right or second position, the laser beam follows the bottom beam path (see FIG. 1) to cut the bottom potion of the insulated wire. While the bottom cut is being executed, the member 114 is moving downward in order to move the slide bearing 130 and the shuttle mirror 14 back to its home position. Note however that because the connector 134 is at the top of the slot 136, or in proximity thereto, and since a finite period of time is required to move the connector 134 back to the bottom of the slot 136 for moving the slide bearing 130 and shuttle mirror 14, a delay is established in returning to shuttle mirror 14 to its home position. This delay permits the completion of the bottom cut of the insulated wire before the shuttle mirror 14 returns to its home position within the path for the laser beam.

Referring to FIG. 6, the clamping portion from FIG. 3 is shown in isolation. As previously noted, the housing 58 retains the scanning mirror 18 (not shown) and, the housing 60 holds the scanning mirror 26 (not shown). The collet guide 62 penetrates a front portion of the support housing 56 for the clamping portion. A wire guide is to be coupled to the clamping portion housing 56 for guiding the insulated wire into the path for the laser beam. The wire guide includes the collet guide 62 in the clamping portion housing 56. Additionally, a guide member or collet 138 is included having a tubular portion 140 for insertion into the tubular cavity of the collet guide 62. The collet 138 also has an interior cavity 142 extending therethrough for inserting the insulated wire 146. A notch 144 is provided in an outer surface of the collet 138 for locking with the spring-loaded locking tab 68. By sliding the operating arm 66 of the locking device 64 to the left against the opposing force associated with the internal spring (not shown), the locking tab 68 is retracted in order to permit a user to insert the collet 138 into the collet guide 62. Then, the user releases the operating arm 68 such that the locking tab 68 engages the notch 144 in the collet 138.

The clamping portion has clamping arms (see FIGS. 8, 10, and 11) for holding the insulated wire 146, and solenoid 148 acts as the actuator for operating the clamping arms. As previously mentioned, the sensor device 74 (see FIG. 12) is activated by the insertion of the insulated wire 146 into the clamping portion in order to initiate operation of the apparatus 10. The specifics of this operation will be discussed hereinafter; however, one of the functions that this initiation accomplishes is the activation of the solenoid 148 to retract its plunger 150. The plunger 150 is coupled to a member 154 which is coupled at one end to an interior surface of the clamping portion housing 56. The opposite end of member 154 has a tab 156 (see FIGS. 10) and 11) that acts upon the lower clamping arm 184 through a member 204. Note that the detailed operation of the clamping arms will be discussed with reference to FIGS. 10 and 11.

Referring to FIG. 7, a cross-sectional view taken along the line 7—7 of FIG. 6 shows the flowpaths of the laser beam resulting in vaporization of a portion of insulation from the insulated wire 146. Note also that this cross-sectional view assumes that the insulated wire 146 has been inserted into the collet 138 (see FIG. 6). In the first half of the cycle of operation of the apparatus 10, the laser beam traverses an top beam path 162, reflects off of scanning mirror 18, and vaporizes an upper portion of insulation 158 from the insulated wire 146. In the second half of the cycle of operation of the apparatus 10, the laser beam travels via a bottom beam path 164 and the scanning mirror 26 to vaporize a bottom portion of insulation 160 from the insulated wire 146. Note that the width of insulation removed in this Figure is exaggerated to show that insulation is actually removed. In practice, the width of the cut through the insulation is narrower. Thus, after the upper 158 and the bottom 160 portions of insulation are removed, a user extracts the insulated wire 146 from the collet 138 (see FIG. 6) and easily removes the end piece of insulation from the insulated wire 146.

Referring to FIG. 8, a perspective view of portions of the interior of the apparatus 10 are shown in order to demonstrate how the single motor 44 moves the scanning mirrors 18 and 26, in addition to moving the shuttle mirror 14, as already disclosed. The apparatus 10 includes a first rotation portion which is eccentrically coupled to an end of the transmission shaft 82 for rotating scanning mirror 26. The first rotation portion includes a member 168 eccentrically coupled at an end 170 thereof to the transmission shaft 82. The other end 180 of the member 168 is coupled to the first collar 172. The first tubular member 86 is coupled to the first collar 172. A left side 86a of the first tubular member 86 is free rotating, and the right side 86b is fixed. Thus, rotation of the transmission shaft 82 is translated to the scanning mirror 26 via the member 168, the first collar 172, and the first tubular member 86a.

The apparatus 10 also includes a second rotation portion coupled to the first rotation portion for rotating scanning mirror 18. The second rotation portion includes a member 96 coupled at an end 178 thereof to the first rotation portion. The opposite end 176 of the member 96 is coupled to a second collar 174. A second tubular member 92 is coupled to the second collar 174. Like the first tubular member 86, the second tubular member 92 is free rotating on the left side 92a of the second collar 174 and fixed to the right 92b. Due to the unique manner of linking the first rotation portion with the second rotation portion, the scanning mirrors 18 and 26 always sweep in opposing directions. In other words, as scanning mirror 18 moves left, scanning mirror 26 moves right, and as scanning mirror 18 moves right, scanning mirror 26 moves left; however, as previously noted, both scanning mirrors 18 and 26 actually reflect the laser beam upon the insulated wire 146 when the scanning mirrors 18 and 26 are moving from left to right. This is so because the motion of the shuttle mirror 14 is synchronized with the scanning mirrors 18 and 26 such that the laser beam is only supplied to the scanning mirror 18 or 26 that is sweeping from left to right. Of course, if desired, the apparatus 10 could be configured such that the laser beam is applied to the scanning mirror 18 or 26 that is sweeping from right to left because regardless of the chosen scanning direction, the insulation on the insulated wire 146 is cut. What is particularly significant is the unique manner of using the single motor 44 to synchronize the sweeping motion of the scanning mirrors 18 and 26 with the linear motion of the shuttle mirror 14 in order to drive the laser beam in a single plane over a top and bottom portion of the insulated wire 146.

FIG. 9 depicts a front planar view of the apparatus 10 showing how the scanning mirrors 18 and 26 direct the laser beam over the upper and bottom portions of the insulated wire 146. The housing 58 and its associated scanning mirror 18, starting from their home, left most position, scan the laser beam from left to right over the top of the insulated wire 146, and then rotate back from right to left to their home position. Note that as scanning mirror 18 moves back to its home position, the laser beam is cutting the bottom of the insulated wire 146. The housing 60 and its associated scanning mirror 26, starting from their home, right most position, rotate to their left most position as the laser beam cuts across the top of the insulated wire 146. Then, once the upper scan of the laser beam is complete, mirror 26 is at its left most position from which it scans the laser beam from left to right over the bottom of the insulated wire 146, thereby returning scanning mirror 26 and housing 60 to their home and right most position.

Figure 10:
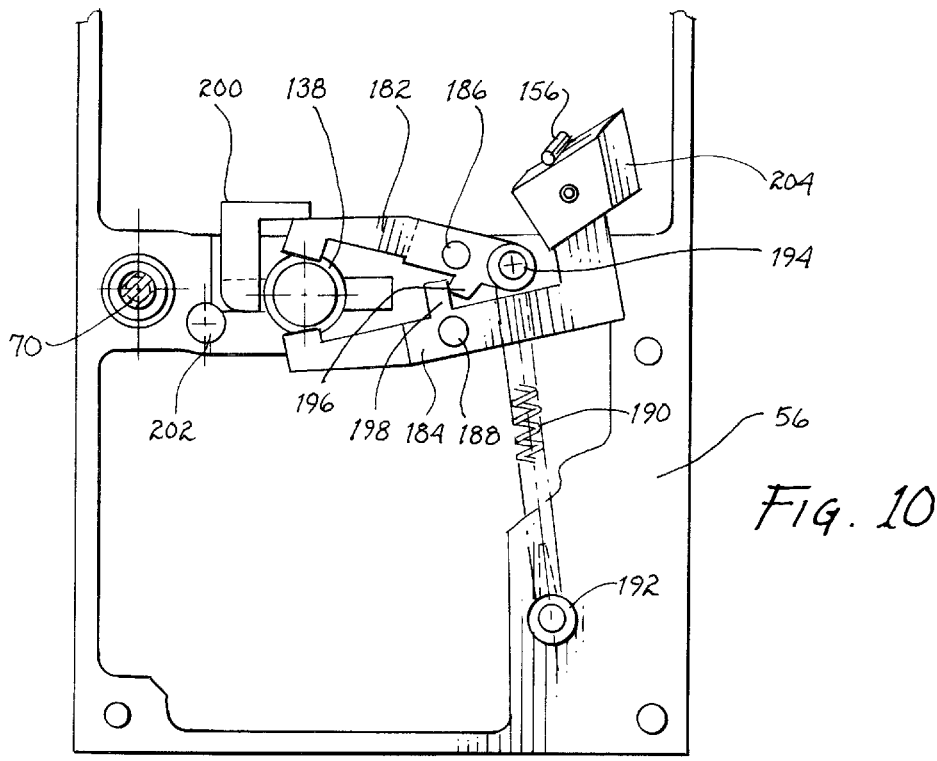
FIG. 10 is a planar view from the inside of the clamping portion and looking out of the front face thereof to show the clamping arms in an open position.
Figure 11:
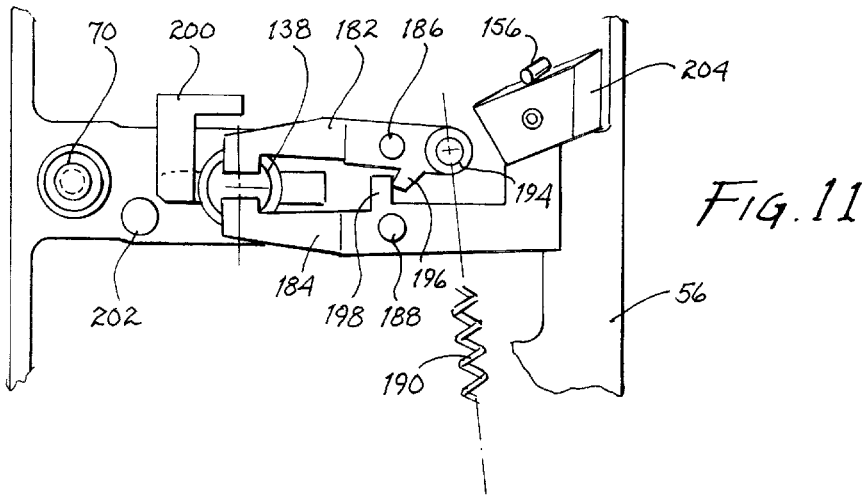
FIG. 11 is a planar view from the inside of the clamping portion and looking out of the front face thereof to show the clamping arms in a closed position. Note that the clamping arms are not shown as actually touching because an insulated wire (not shown) would be held therein.

Referring to FIGS. 10 and 11, the clamping arms 182 and 184 of the clamping portion are shown in an open and closed position, respectively. To enhance understanding of what these Figures are showing, note that FIGS. 10 and 11 are showing the inner surface of the front part of the clamping portion housing 56. The clamping arm portion of the apparatus 10 includes an upper clamping arm 182 pivotally coupled with a connector 186 to the inner surface of the front part of the clamping portion housing 56. Similarly, a lower clamping arm 184 is pivotally coupled with a connector 188 to the inner surface of the front part of the clamping portion housing 56. A spring 190 is coupled with a connector 192 to the inner surface of the clamping portion housing 56 and to an end 194 of the upper clamping arm 182 for pulling down on the end 194 of the upper clamping arm 182 and opening the clamping arms 182 and 184. A first protruding portion 196 extends downwardly from the upper clamping arm 182 substantially toward the pivot point 188 for the lower clamping arm 184. Additionally, a second protruding portion 198 extends upwardly from the lower clamping arm 184 substantially toward the pivot point 186 for the upper clamping arm 182. Note that the portions of the clamping arms 182 and 184 that actually grip the insulated wire 146 penetrate an upper and lower aperture (not shown) in a portion of the collet 138 extending through the collet guide 62.

The actuator for the clamping arms 182 and 184 is the solenoid 148 (see FIG. 6) which acts upon member 204 via the tab 156 which is driven downward by activation of the solenoid 148. When the solenoid 148 is not activated, the spring 190 pulls down on the end 194 of the upper clamping arm 182. Since the upper clamping arm 162 pivots about the connector 186, the upper clamping arm 182 is forced open, and the left side of the first protruding portion 196 slides up and to the left against the right side of the second protruding portion 198, thereby forcing the lower clamping arm 184 to pivot to the open position. When the solenoid 148 is activated, the plunger 150 (see FIG. 6) is retracted, and therefore, tab 156 is pulled down upon member 204. The downward force against the member 204 causes the lower clamping arm 184 to pivot about connector 188 in the closing direction, and the right side of the second protruding portion 198 pushes up and to the right against the left side of the first protruding portion 196, thereby causing the upper clamping arm to move about its pivotal connector 186 in a closing direction. The force associated with the activation of the solenoid 148 is sufficient to overcome the opposing force associated with the spring 190. When the solenoid 148 is deactivated, the force associated with the spring 190 opens the clamping arms 182 and 184 as previously described. Also, note that a mechanical stop 200 is provided for limiting motion of the upper clamping arm 182 due to the spring 190 when the clamping arms 182 and 184 are opened. Since the opening movement of the upper clamping arm 182 assists in opening the lower clamping arm 184, the mechanical stop 200 also limits the opening motion of the lower clamping arm 184.

Figure 12:
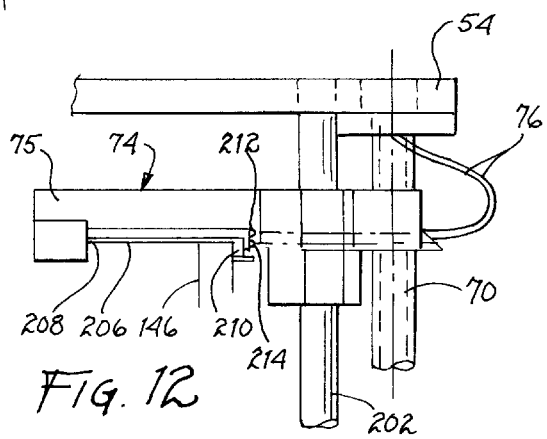
FIG. 12 is a top planar view of the sensor portion located in the clamping portion of FIG. 6, but not visible in that view.

Referring to FIG. 12, a top planar view is shown of the sensor device 74 located within the clamping portion of the apparatus 10. The sensor device includes a reference member 75 retaining both a transmitter 212 such as an LED far transmitting a signal and a receiver 214 such as a phototransistor for receiving the signal from the transmitter 212, thereby initiating the apparatus 10. A signal reflector 206 is coupled to the reference member 75 at an end 208. At an opposite end of the signal reflector 206 is an L-shaped bend 210 for reflecting the signal from the transmitter 212 to the receiver 214 when the insulated wire 146 penetrates the cavity in the collet 138 (see FIG. 6) and moves the signal reflector 206 into position to reflect the signal. Two fiber optic cables 76 are provided; one supplies a signal to the transmitter 212, and the other receives the reflected signal from the receiver 214 and diverts it to the controller 34 (see FIG. 2). Note that the adjustment screw 70 penetrates the reference member 75 and is coupled to the apparatus housing 54. In order to avoid rotating the reference member 75 as the adjustment screw 70 is rotated, a support bearing 202 penetrates the reference member 75 and is coupled to the apparatus housing 54.

OPERATION

With reference to FIG. 8, the user first sets the desired position for making the cut on the insulated wire 146, thereby exposing the desired length of wire once the end segment of insulation has been removed. By turning the adjustment screw 70 and watching the measuring pointer 72, the user accomplishes this step. Again, since turning the adjustment screw 70 moves the sensor device 74 either back or forward and because the apparatus 10 is initiated by the contact of the insulated wire 146 with the sensor device 74, the amount of insulation to be removed can be determined accurately by turning the adjustment screw 70 and watching the measuring pointer 72.

Next, the user selects a collet 138 having an interior cavity 142 corresponding to the size and shape of the insulated wire 146 or wires. In other words, different collets 138 can have differently sized and shaped interior cavities 142 which correspond to the size and shape of a single wire 146, or a cable, a ribbon, or the like consisting of several insulated wires 146. Referring to FIG. 6, the collet 138 is then inserted into the collet guide 62 and locked into place using the locking tab 68 to engage the notch 144 in the collet 138 as previously discussed. Now referring to FIG. 3, the user sets the desired laser power, scan speed, and cycle count with the selectors 100. Additionally, note that the user applies power to the apparatus 10 by pressing the power button 98.

The user then inserts the insulated wire 146 through the interior cavity 142 of the collet 138 (see FIG. 6). The wire passes the open clamping arms 182 and 184, then reaches the sensor device 74. Now referring to FIG. 12, the insulated wire 146 contacts and moves the signal reflector 206. The L-shaped bend 210 of the signal reflector 206 reaches the point at which the signal transmitted from the transmitter 212 is reflected off of the L-shaped bend 210 to the receiver 214. Notice of the receipt of the reflected signal is routed to the controller 34 via the fiber optic cable 76 associated with the receiver 214 in order to initiate the apparatus cycle.

Now referring to FIGS. 10 and 11, the solenoid 148 (see FIG. 6) is activated by the controller 34. When the solenoid 148 is activated, the plunger 150 is retracted, and therefore, the tab 156 is pulled down upon the member 204. The downward force against the member 204 causes the lower clamping arm 184 to pivot about connector 188 in the closing direction, and the right side of the second protruding portion 198 pushes up and to the right against the left side of the first protruding portion 196, thereby causing the upper clamping arm 182 to move about its pivotal connector 186 in a closing direction. Thus, the clamping arms 182 and 184 grip the insulated wire 146.

After a short delay, the scanning portion of the cycle begins and the laser beam source 32 is activated. With reference to FIG. 8, recall the respective home positions for the shuttle mirror 14, scanning mirror 18, and scanning mirror 26, namely, aligned within the path for the laser beam such that the beam is first conveyed to the top beam path, pointing to the left most position, and pointing to the right most position. It is also important to remember that the scanning mirrors 18 and 26 always move in opposing directions, but both scanning mirrors 18 and 26 only scan the laser beam over the insulated wire 146 while moving from left to right.

When the controller 34 activates the motor 44, the pulley 78 begins to rotate in a clockwise direction, if one viewed the front face of the pulley 78. Thus, the belt 80, the pulley 166, and the transmission shaft 82 also begin to rotate in a clockwise direction. Meanwhile the controller 34 has already activated the laser beam source 32 shortly after the insulated wire 146 has been gripped. Now, focusing on the end 170 of the member 168, note the four positions a, b, c, and d. Moving in a clockwise manner from positions a to c, the shuttle mirror 14 is aligned with the laser beam path in order to direct the laser beam to the top laser beam path. Additionally, from positions a to c, scanning mirror 18 sweeps the laser beam from left to right over the top of the insulated wire 146 as the scanning mirror 18 moves from its left most position to its right most position, and scanning mirror 26 moves in the opposite direction.

Continuing in the clockwise direction, from positions c to a, the shuttle mirror 14 is out of the laser beam path. Thus, the laser beam is directed from mirror 12 to mirror 22, and through the bottom beam path. Thus, from positions c to a, scanning mirror 26 sweeps the laser beam from left to right across the bottom of the insulated wire 146 as the scanning mirror 26 moves from its left most position to its right most position, and scanning mirror 18 moves in the opposite direction.

Position a corresponds to the home position for the mirrors 14, 18, and 26. In position b, both scanning mirrors 18 and 26 are in their mid-positions; in other words pointing directly at the centerline of the insulated wire 146. Recall however that from position a through c, the shuttle mirror 14 directs the laser beam to the top beam path, so scanning mirror 18 sweeps the laser beam over the top of the insulated wire 146. In position c, scanning mirror 18 has completed its scan and is located at its right most position, but scanning mirror 26 is just beginning its scan from its left most position to its right most position across the bottom of the insulated wire 146. In position d, both scanning mirrors 18 and 26 are in their mid-positions, but from position c through a, the shuttle mirror 14 directs the laser beam to the bottom beam path, so scanning mirror 26 sweeps the laser beam over the bottom of the insulated wire 146. As scanning mirror 26 completes its scan, the mirrors 14, 18 and 26 reach their original home positions in order to either execute another cycle on the same insulated wire 146, if more than one cycle is programmed, or wait to begin a new cycle on another insulated wire 146.

When the mirrors 14, 18, and 26 reach their home positions and scanning mirror 26 has completed its sweep, the controller 34 secures the laser beam source 32, the motor 44, and the solenoid 148 simultaneously. With reference to FIG. 10, when the solenoid 148 (see FIG. 6) is deactivated, the force associated with the spring 190 opens the clamping arms 182 and 184 as previously described. Also as previously described, the mechanical stop 200 limits the opening motion of the upper clamping arm 182 and the lower clamping arm 184.

With the cycle now complete, the user removes the insulated wire 146 from the collet 138. The insulated wire 146 has a narrow cut across its upper and bottom halves, and the user easily removes the end segment of insulation, thereby exposing the underlying wire.

Although the invention has been particularly shown and described with reference to a preferred embodiment thereof, it will be understood by those skilled in the art that changes in form and detail may be made therein without departing from the spirit and scope of the invention.

What is claimed is:

1. A laser wire stripping apparatus comprising, in combination:

means for generating a laser beam;

a plurality of mirror means for alternatively directing said laser beam over a first portion of an insulated wire and an opposite portion of said insulated wire to permit removal of an end segment of insulation from said insulated wire; and means coupled to said plurality of mirror means for synchronizing motion of said plurality of mirror means in order to direct said laser beam over said first portion and said opposite portion of said insulated wire, said synchronizing means comprises a single motor.

2. The apparatus of claim 1 further including a plurality of lens means disposed in a path of said laser beam for focusing said laser beam.

3. The apparatus of claim 1 wherein said plurality of mirror means includes first mirror means having a first position for directing said laser beam in a track leading to said first portion of said insulated wire and having a second position located out of said laser beam.

4. The apparatus of claim 3 wherein said plurality of mirror means further includes second mirror means for directing said laser beam from said first mirror means in said first position over said first portion of said insulated wire.

5. The apparatus of claim 3 wherein said plurality of mirror means further includes third mirror means for directing said laser beam over said opposite portion of said insulated wire when said first mirror means is in said second position.

6. The apparatus of claim 5 further including fourth mirror means for directing said laser beam to said third mirror means when said first mirror means is in said second position.

7. The apparatus of claim 5 including a transmission shaft wherein said synchronizing means has shaft means coupled to said transmission shaft for rotating said transmission shaft, said transmission shaft coupled to said third mirror means.

8. The apparatus of claim 7 further including first rotation means eccentrically coupled to a first end of said transmission shaft for rotating said third mirror means.

9. The apparatus of claim 8 wherein said first rotation means comprises:

a first member eccentrically coupled at an end thereof to said first end of said transmission shaft;

first collar means coupled to an opposite end of said first member for rotating said third mirror means; and first tubular member means coupled to said first collar means for rotating said third mirror means and for passing said laser beam therethrough to said third mirror means.

10. The apparatus of claim 8 further including second rotation means coupled to said first rotation means for rotating said second mirror means.

11. The apparatus of claim 10 wherein said second rotation means comprises:
a second member coupled at an end thereof to said first rotation means;
second collar means coupled to an opposite end of said second member for rotating said second mirror means; and
second tubular member means coupled to said second collar means for rotating said second mirror means and for passing said laser beam therethrough to said second mirror means.

12. The apparatus of claim 7 further including oscillating means eccentrically coupled to a second end of said transmission shaft for moving said first mirror means between said first position and said second position.

13. The apparatus of claim 12 wherein said oscillating means comprises:
a third member eccentrically coupled at an end thereof to said transmission shaft;
a fourth member having a substantially L-shaped configuration and being coupled at an end thereof to an opposite end of said third member, and being pivotally coupled at a mid-portion thereof to a support member;
slide bearing means coupled to another end of said fourth member for sliding said first mirror means between said first position and said second position;
delay means within said fourth member for delaying movement of said first mirror means from said second position to said first position; and
sensor means coupled to said support member for measuring a position of said first mirror means.

14. The apparatus of claim 13 wherein said delay means comprises:
a slot near said another end of said fourth member; and
slidable connector means coupled to said slide bearing means and penetrating said slot for sliding within said slot and delaying movement of said first mirror means from said second position to said first position.

15. The apparatus of claim 1 further including clamping means coupled to said insulated wire for holding said insulated wire in a path for said laser beam.

16. The apparatus of claim 15 wherein said clamping means comprises:
a support housing;
wire guide means coupled to said support housing for guiding said insulated wire into said path;
locking means coupled to said support housing for locking said wire guide means into place;
sensor means coupled to said support housing for detecting when said insulated wire is in said path and for actuating said apparatus; and
clamping arm means coupled to said support housing for holding said insulated wire in said path.

17. The apparatus of claim 16 wherein said wire guide means comprises:
a tubular cavity in said support housing;
guide member means having a tubular portion for insertion into said tubular cavity and having another cavity extending through said guide member means for inserting said insulated wire therethrough; and
notch means in an outer surface of said guide member means for locking with said locking means.

18. The apparatus of claim 17 wherein said locking means includes spring-loaded locking tab means coupled to said support housing for insertion into said notch means.

19. The apparatus of claim 17 wherein said sensor means comprises:
a reference member;
transmitter means coupled to said reference member for transmitting a signal;
receiver means coupled to said reference member for receiving said signal and for initiating said apparatus;
signal reflector means coupled to said reference member for reflecting said signal from said transmitter means to said receiver means when said insulated wire penetrates said another cavity in said guide member means and moves said signal reflector means into position to reflect said signal; and
adjustment means coupled to said reference member for adjusting distance between said signal reflector means and said clamping arm means.

20. The apparatus of claim 16 wherein said clamping arm means comprises:
an upper arm pivotally coupled to said support housing;
a lower arm pivotally coupled to said support housing;
spring means coupled to said support housing and to an end portion of said upper arm for pulling down on said end portion of said upper arm and opening said clamping arm means;
a first protruding portion extending downwardly from said upper arm substantially toward a pivot point for said lower arm;
a second protruding portion extending upwardly from said lower arm substantially toward a pivot point for said upper arm and contacting said first protruding portion;
actuator means coupled to an end portion of said lower arm for forcing said upper arm and said lower arm to close and grip said insulated wire; and
mechanical stop means for limiting motion of said upper arm due to said spring means and for limiting motion of said lower arm.

21. A laser wire stripping apparatus comprising, in combination:
means for generating a laser beam;
a plurality of mirror means for alternatively directing said laser beam over a first portion of an insulated wire and an opposite portion of said insulated wire to permit removal of an end segment of insulation from said insulated wire; and
motor means coupled to said plurality of mirror means for synchronizing motion of said plurality of mirrors means in order to direct said laser beam over said first portion and said opposite portion of said insulated wire;
said motor means comprising a single motor;
said plurality of mirror means including first mirror means having a first position for directing said laser beam in a track leading to said first portion of said insulated wire and having a second position located out of said laser beam;
said plurality of mirror means further including second mirror means for directing said laser beam from said first mirror means in said first position over said first portion of said insulated wire;

said plurality of mirror means further including third mirror means for directing said laser beam over said opposite portion of said insulated wire when said first mirror means is in said second position;

fourth mirror means for directing said laser beam to said third mirror means when said first mirror means is in said second position;

said motor means having shaft means coupled to a transmission shaft for rotating said transmission shaft;

first rotation means eccentrically coupled to a first end of said transmission shaft for rotating said third mirror means;

said first rotation means comprising:

a first member eccentrically coupled at an end thereof to said first end of said transmission shaft;

first collar means coupled to an opposite end of said first member for rotating said third mirror means; and first tubular member means coupled to said first collar means for rotating said third mirror means and for passing said laser beam therethrough to said third mirror means;

second rotation means coupled to said first rotation means for rotating said second mirror means;

said second rotation means comprising:

a second member coupled at an end thereof to said first rotation means;

second collar means coupled to an opposite end of said second member for rotating said second mirror means; and second tubular member means coupled to said second collar means for rotating said second mirror means and for passing said laser beam therethrough to said second mirror means;

oscillating means eccentrically coupled to a second end of said transmission shaft for moving said first mirror means between said first position and said second position;

said oscillating means comprising:

a third member eccentrically coupled at an end thereof to said transmission shaft;

a fourth member having a substantially L-shaped configuration and being coupled at an end thereof to an opposite end of said third member, and being pivotally coupled at a mid-portion thereof to a support member;

slide bearing means coupled to another end of said fourth member for sliding said first mirror means between said first position and said second position;

delay means within said fourth member for delaying movement of said first mirror means from said second position to said first position; and sensor means coupled to said support member for measuring a position of said first mirror means;

said delay means comprising:

a slot near said another end of said fourth member; and slidable connector means coupled to said slide bearing means and penetrating said slot for sliding within said slot and delaying movement of said first mirror means from said second position to said first position;

clamping means coupled to said insulated wire for holding said insulated wire in a path for said laser beam;

said clamping means comprising:

a support housing;

wire guide means coupled to said support housing for guiding said insulated wire into said path;

locking means coupled to said support housing for locking said wire guide means into place;

sensor means coupled to said support housing for detecting when said insulated wire is in said path and for actuating said apparatus; and clamping arm means coupled to said support housing for holding said insulated wire in said path;

said wire guide means comprising:

a tubular cavity in said support housing;

guide member means having a tubular portion for insertion into said tubular cavity and having another cavity extending through said guide member means for inserting said insulated wire therethrough; and notch means in an outer surface of said guide member means for locking with said locking means;

said locking means including spring-loaded locking tab means coupled to said support housing for insertion into said notch means;

said sensor means comprising:

a reference member;

transmitter means coupled to said reference member for transmitting a signal;

receiver means coupled to said reference member for receiving said signal and for initiating said apparatus;

signal reflector means coupled to said reference member for reflecting said signal from said transmitter means to said receiver means when said insulated wire penetrates said another cavity in said guide member means and moves said signal reflector means into position to reflect said signal; and adjustment means coupled to said reference member for adjusting distance between said signal reflector means and said clamping arm means;

said clamping arm means comprising:

an upper arm pivotally coupled to said support housing;

a lower arm pivotally coupled to said support housing;

spring means coupled to said support housing and to an end portion of said upper arm for pulling down on said end portion of said upper arm and opening said clamping arm means;

a first protruding portion extending downwardly from said upper arm substantially toward a pivot point for said lower arm;

a second protruding portion extending upwardly from said lower arm substantially toward a pivot point for said upper arm and contacting said first protruding portion;

actuator means coupled to an end portion of said lower arm for forcing said upper arm and said lower arm to close and grip said insulated wire; and mechanical stop means for limiting motion of said upper arm due to said spring means and for limiting motion of said lower arm; and a plurality of lens means disposed in a path of said laser beam for focusing said laser beam.

22. A method for stripping insulation from an insulated wire comprising the steps of:

reflecting a laser beam off of a first mirror in a first position to a second mirror;

rotating said second mirror in order to scan said laser beam over a first portion of said insulated wire;

moving said first mirror to a second position out of said laser beam to reflect said laser beam off of a third mirror to a fourth mirror;

rotating said fourth mirror in order to scan said laser beam over an opposite portion of said insulated wire; and using a single motor for moving said first mirror and for rotating said second mirror and said fourth mirror.

23. The method of claim 22 wherein said steps of rotating said second mirror, moving said first mirror, and rotating said fourth mirror are provided by operating said single motor rotating a transmission shaft coupled to said first mirror, said second mirror, and said fourth mirror.

24. The method of claim 22 further including the steps of:

inserting said insulated wire through a cavity in a wire guide;

moving a reflector with said insulated wire penetrating said wire guide;

reflecting a signal from a transmitter off of said reflector to a receiver when said reflector has been moved by said insulated wire; and clamping said insulated wire in response to receipt of said signal at said receiver.

25. The method of claim 24 further including the steps of:

withdrawing said insulated wire from said wire guide; and removing an end segment of insulation from said insulated wire severed from another portion of insulation by passing said laser beam over said first portion and said opposite portion of said insulated wire.

26. The method of claim 22 wherein said steps of rotating said second mirror and rotating said fourth mirror direct said laser beam in a single plane over a top and a bottom portion of said insulated wire.

* * * * *